United States Patent [19]
Gilliland et al.

[11] Patent Number: 5,966,487
[45] Date of Patent: Oct. 12, 1999

[54] EXTERNAL PLUGGABLE HIGH FREQUENCY DATA COMMUNICATION MODULE

[75] Inventors: Patrick B. Gilliland, Chicago; Leonid G. Shatskin, Wheaton; Daniel S. Poplawski, Montgomery, all of Ill.

[73] Assignee: Methode Electronics, Inc., Chicago, Ill.

[21] Appl. No.: 08/863,767

[22] Filed: May 27, 1997

[51] Int. Cl.$^6$ ...................................................... G02B 6/36
[52] U.S. Cl. ................................ 385/92; 385/88; 385/76; 385/77; 385/24; 385/139; 385/53
[58] Field of Search ................................. 385/53, 56, 73, 385/75, 76, 77, 88, 89, 92, 94, 24, 139

[56] References Cited

U.S. PATENT DOCUMENTS

| | | | |
|---|---|---|---|
| 4,245,887 | 1/1981 | Johnson | 385/60 X |
| 4,253,730 | 3/1981 | Logan et al. | 385/75 X |
| 4,445,750 | 5/1984 | Grois et al. | 385/75 X |
| 4,449,784 | 5/1984 | Basov et al. | 385/75 X |
| 5,157,749 | 10/1992 | Briggs et al. | 385/60 |
| 5,596,663 | 1/1997 | Ishibashi et al. | 385/92 |

*Primary Examiner*—Brian Healy
*Attorney, Agent, or Firm*—Karl D. Kovach; David L. Newman

[57] ABSTRACT

A Media Interface Adapter (MIA) module is provided for converting Fiber Channel data signals from a first copper transfer medium to a second alternate transfer medium. The MIA includes an internal mounted printed circuit board containing the electronic components necessary to convert signals between the first copper medium and second alternate medium. A transmitter is provided for transmitting the data signals over the second alternate transfer medium, and a receiver is provided for receiving data signals over the second alternate transfer medium. Opposite the transmitter and receiver, a nine pin electrical D-sub connector is provided for connecting the module to the first copper transfer medium. The D-sub connector has a metal flange insertable into a connector mounting structures formed in the housing. The connector mounting structures being configured to partially overlap the flange of the D-sub connector. Likewise, the first and second housing members further include transmitter and receiver mounting structures configured to partially overlap the transmitter and receiver packages. Finally, the housing members are configured to enclose the printed circuit board, transmitter, receiver, and electrical connector, the first and second housing members having longitudinal sidewalls including overlapping mating structures forming an overlapping joint between the two housing members.

32 Claims, 3 Drawing Sheets

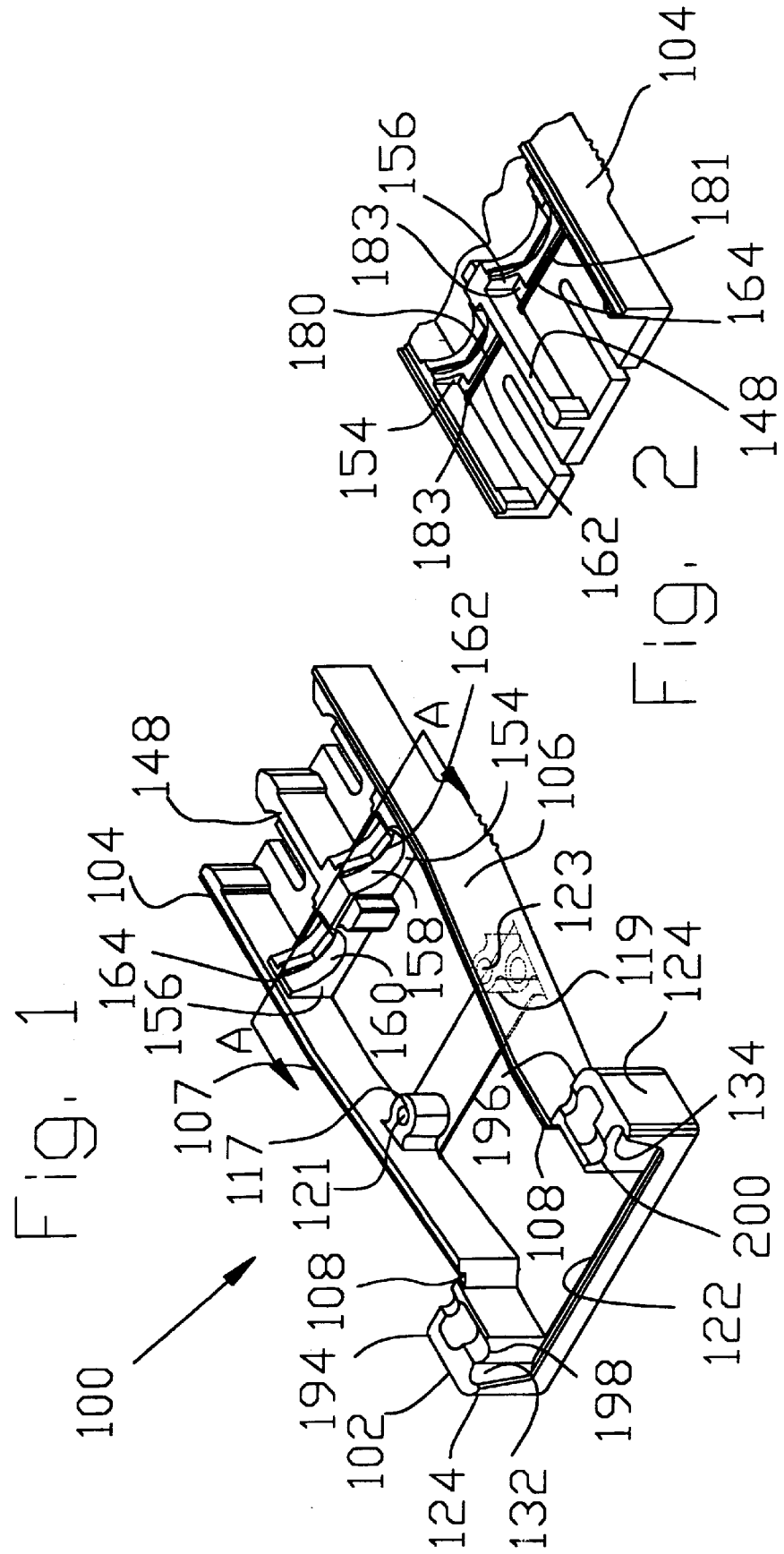

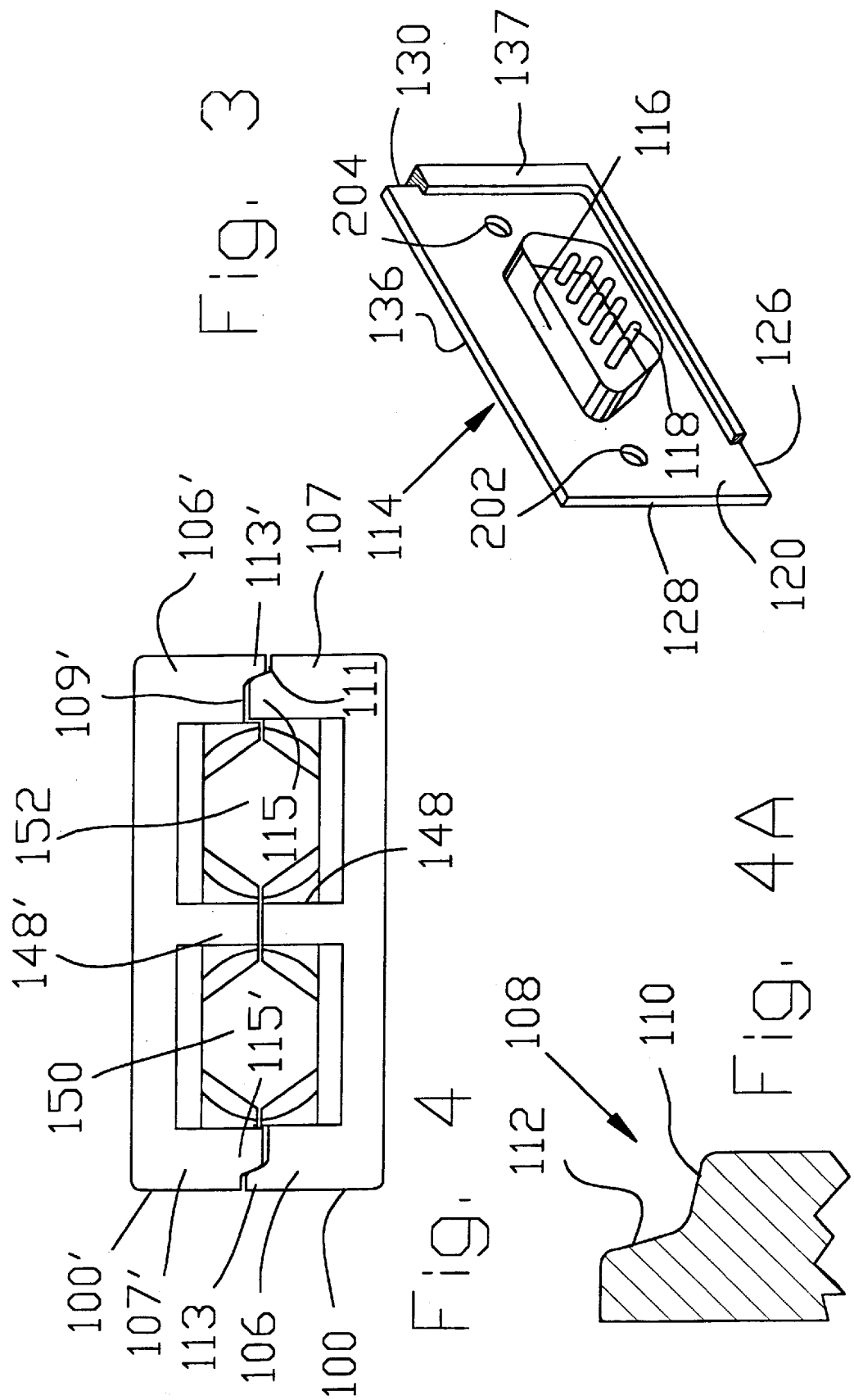

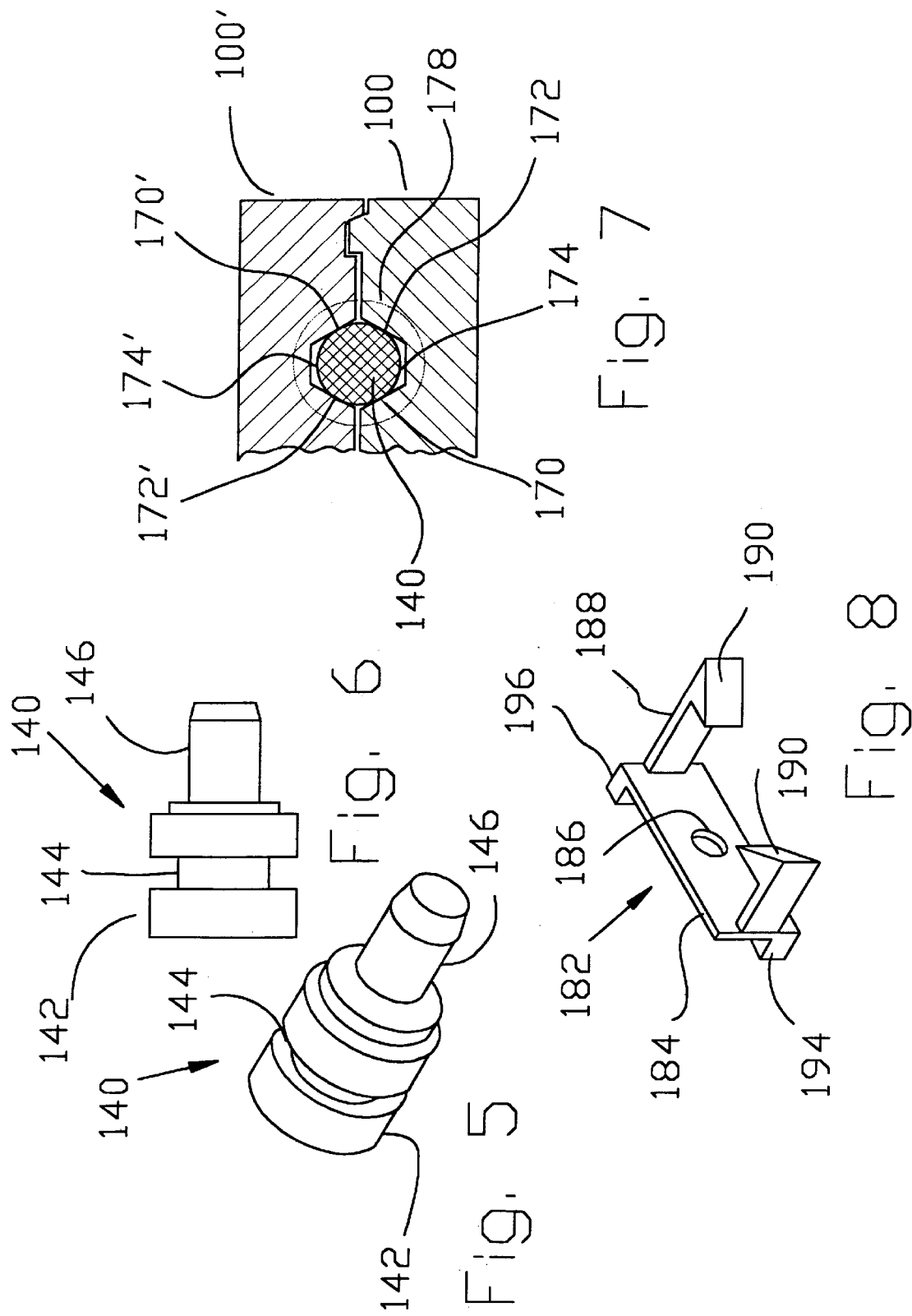

EXTERNAL PLUGGABLE HIGH FREQUENCY DATA COMMUNICATION MODULE

BACKGROUND OF THE INVENTION

The present invention relates to an external high frequency data communication module, and more particularly a module housing comprised of two identical hermaphroditic housing members. The communication module provides a high performance data link for bi-directional communication over a variety of transfer media, such as single mode or multimode optical fiber in high speed data applications such as Fibre Channel and other applications.

The preferred embodiment of the present invention provides a module configured for use in Fibre Channel applications. Fibre Channel is the general name for an integrated set of standards being developed by the American National Standards Institute (ANSI) under the rubric of ANSI committee X3T11. Fibre Channel provides a high speed data link transmitting data between workstations, mainframes and super computers, as well as connection to mass storage devices and other peripherals. Fibre Channel operates at 1.0625 Gb/s, providing a bandwidth of 100 Mbytes/s over a single cable. The high speed and large bandwidth of Fibre Channel allows massive amounts of data to be transferred quickly and accurately between devices. The Fibre Channel physical layer can be configured in either a point to point configuration, or an arbitrated loop. In the point-to-point configuration, data is exchanged bi-directionally between two host devices. In an arbitrated loop configuration, the transmitted data signal of a first device is connected to the receive port of a second device, and the transmitted data signal from the second device is connected to the receive port of a third device, and so on in a daisy-chain configuration until finally, the transmitted data signal from the $n^{th}$ device is connected to the receive port of the first device. The Fibre Channel standard is designed to support a number of different transfer media, including short wave laser using 50 or 62.5 micron multimode optical fiber, long wave laser using single mode fiber, and copper using a variety of media and connectors including twinax and coax copper cable.

As noted, Fibre Channel provides a high speed serial data link for transmitting data between electronic devices. Fibre Channel Arbitrated Loop is particularly well suited for storage attach applications such as large disc arrays. The high data rate and large band width of Fibre Channel Arbitrated Loop (FC-AL) allows massive amounts of data to be transferred quickly and accurately between a host mainframe computer or local area network and one or more large disc storage arrays. However, in order for Fibre Channel technology to be accepted in the storage attach marketplace, it has been necessary to develop a cost effective entry solution as compared with other data storage architectures such as high end SCSI.

The initial approach to FC-AL required a mezzanine Gigabaud Link Module (GLM) attached to a host adapter board mounted within each device connected to the Fibre Channel link. A GLM is an intermediary device containing high speed transceiver components which convert back and forth between the parallel bus structure of a host device, and the serial format of the Fibre Channel link. This approach, while effective, imposed unnecessary cost and space penalties making FC-AL less attractive in the storage attach market when compared with alternative technologies.

As an alternative to the GLM approach, the high speed transceiver components may be mounted within the host devices comprising the nodes of the Fibre Channel network. With this arrangement, DB-9 electrical connectors may be installed on the adapter boards for external connection to an all copper transfer medium. This provides an effective, low cost entrance to the Fibre Channel environment. However, a problem with the majority copper environment is that at 1.0625 Gb/s copper is only effective as a transfer medium up 30 meters. For distances greater than 30 meters the electrical signal carried on the copper cables must be converted to an alternate transfer medium, the most prevalent being optical fiber. At 1.0625 Gb/s distances up to 500 meters can be achieved with multi-mode fiber, and with single mode fiber distances up to 30 kilometers can be realized. While converting from copper to an alternate transfer medium is effective for transmitting data over longer distances, the hardware necessary for implementing the conversion from one medium to another represents another area where the cost of FC-AL must be constrained.

In order to provide an industry solution and further advance the market acceptance of FC-AL, a number of manufacturers have developed a standard for an external pluggable conversion module for transitioning between copper and other media. The Media Interface Adapter (MIA) specification represents the results of that effort. The MIA specification was developed independent of ANSI, but it is anticipated that the specification will be submitted to the appropriated subgroup of committee X3T11 for inclusion in the Fibre Channel standard. The MIA specification defines a Media Interface Adapter as an external plug-in module containing a nine-pin D-sub connector, the required electronics necessary for implementing the conversion between media, and the necessary connector to adapt to the alternate medium. The module is to be rear panel/card edge mountable to a host adapter. The MIA specification specifies the mechanical, electrical, and signaling requirements for an MIA and the connectors used to adapt to the various media. A nine pin D-sub male connector is specified for the MIA module, and is intended to mate with a corresponding nine pin D-sub female connector edge mounted to a host adapter board, thereby providing the connection between the module and the copper Fibre Channel environment. The conversion electronics are housed within the module between the two connectors. Opposite the nine pin D-sub connector, the media interface connector is to be application specific, depending on the alternate medium being converted to. The physical dimensions of the module are specified as a maximum height of 36.00 mm, and a maximum width of 20.00 mm. There is no restriction on the length of the module. It is envisioned that a number of such modules would be plugged into a corresponding number of adapter boards arranged adjacent one another in a panel.

The MIA specification further defines the electrical interface requirements for the Media Interface Adapter. The electrical requirements include power consumption, supply requirements, and fusing. Signal levels are also specified for both high frequency signals and control signals. Finally, and most significantly regarding the present invention, the environmental/FCC requirements are specified. The environmental specification is application specific, however it is recommended that the MIA be qualified for operation at FCC class B. The FCC Class B qualification is preferred because at the high frequencies at which the module is to operate, the electronic components and electrical conductors within the module have a tendency to act as radiators, generating a large amount of high frequency electromagnetic interference (EMI) in the vicinity of the module. Since it is anticipated that a number of these modules will be in operation directly adjacent one another, or at least in near proximity to one another, it is critical to the performance of the modules that spurious electromagnetic emissions are prevented from escaping the module housing.

The most effective method of preventing spurious emissions is to enclose the module in a metallic housing and ground the housing. Employing this method, it is important to ensure that there are no gaps in the housing through which high frequency radiation can escape. Except for the connector regions at each end, the connector housing must present a continuous grounded metal surface around the entire module. Special care must be taken concerning any joints between separate pieces of the housing, and those areas of the housing surrounding the connectors at each end of the housing. At the connector end a standard nine-pin D-sub connector is provided having a metal flange surrounding the D-shell connector assembly. A continuous electrical connection must be maintained between the flange and the housing along the entire perimeter of the flange. At the alternate media interface end, a continuous metal surface must also be presented except for the minimal area connecting the alternate medium.

Meeting the environmental/FCC requirements of the MIA specification presents a number of design problems for developing an effective, low cost, and easy to assemble module. What is needed is a module housing which is easily assembled, and having design features which, when assembled, allow the housing to completely electrically seal the contents of the module. Such a module housing would preferably comprise two identical metallic pieces having a hermaphroditic mating feature along the mating surfaces thereof such that when the two pieces are assembled around a nine pin D-sub connector and application specific media interface connector, the two pieces form a continuous metal surface completely surrounding the contents of the housing. Providing two identical pieces helps to lower the cost of the module in that tooling for only a single piece is required, and only a single piece need be inventoried. Such a module housing would further include provisions to ensure that a continuous electrical connection is formed between the housing and the flange of the nine-pin D-sub connector, and between the housing and the media interface connectors. In a version configured to interface with an optical fiber medium, the module housing should also contain internal features for properly aligning optical elements with a mateable fiber optic connector. Finally, such a module housing should also be configured to meet the physical requirements of the MIA specification, and should be easily mated with and withdrawn from a FC-AL adapter board, and have provisions for securing the connection therebetween.

SUMMARY OF THE INVENTION

In light of the background given above, one of the main objectives of the present invention is to provide an easily assembled external pluggable high frequency data communication module.

Another objective of the present invention is to provide a Media Interface Adapter meeting the requirements of the MIA specification.

A further object of the present invention is to provide a module housing which acts to electrically seal the module, preventing high frequency electromagnetic radiation generated within the module from escaping.

And another object of the inventions is to provide a module housing for a high frequency data communication module with reduced susceptibility to externally generated electromagnetic interference.

Another objective of the present invention is to provide a two piece module housing comprised of two identical metal pieces, each having hermaphroditic mating surfaces providing interlocking mateability of the two pieces.

Still another objective of the present invention is to provide a module housing comprised of two metallic pieces which, when assembled, form a continuous metal shell surrounding the components housed therein.

Yet another objective of the present invention is to provide a two piece metallic module housing configured to engage the metal flange of a nine-pin D-sub style connector.

An additional objective of the present invention is to provide a Media Interface Adapter module for interfacing between a Fibre Channel Arbitrated Loop copper environment to an optical fiber transfer medium.

A further objective of the present invention is to provide an optical Media Interface Adapter module housing having an integral alignment feature which acts to properly align optical components within the module upon assembling the housing.

All of these objectives, as well as others that will become apparent upon reading the detailed description of the presently preferred embodiments of the invention below, are met by the Media Interface Extender Housing herein disclosed.

The present invention relates to a high frequency data communication module, and more particularly to an improved housing for such a module. The preferred embodiment of the invention provides a Media Interface Adapter (MIA) for converting between a Fibre Channel copper environment and a fiber optic transfer medium. However, the novel aspects of the invention may be practiced on other high frequency data modules, and MIA converting between alternate Fibre Channel environments as well. In the preferred embodiment, the improved module housing comprises two identical housing members formed of a conductive metal such as ZA-8. In addition to the zinc-aluminum alloy, it is also contemplated that the housing members may be comprised of a metallized conductive plastic material. The two housing members are configured such that when brought together in opposite transverse relation to one another, the two pieces form a single outer shell defining an internal cavity of sufficient extent to house the high frequency components necessary to convert gigahertz signals from a high frequency copper environment to an alternate medium such as optical fiber. The longitudinal sides of the two housing members are each topped with asymmetrical rabbets, each facing the same direction. The asymmetrical rabbets form the hermaphroditic mating surfaces of the housing members. When the two housing members are mated opposite one another, the rabbets interlock with one another to form a pair of shiplap joints along the entire length of both sides of the adapter housing. The overlapping character of the joint is significant in that it presents a continuous metal barrier along the sides of the housing. Electromagnetic radiation emanating from the high frequency components housed within the module will be blocked from escaping through the seam created by the joinder of the two housing members. Likewise, EMI generated external to the module will be blocked from entering the module and interfering with the sensitive components housed therein.

Like the longitudinal sides of the housing, the connector and media ends of the module housing are also electromagnetically sealed. When the two housing members are assembled, they define a rectangular opening in the front end of the connector. The rectangular opening is configured to accommodate the rectangular metal flange of a standard nine-pin D-sub connector. The two metal housing members are formed with a shallow internal groove around the opening in the front end of the housing for the purpose of mounting the nine-pin D-sub connector as well as electrically sealing the connector end of the module. With the two housing members assembled, the groove is continuous around the opening. The perimeter of a standard nine pin D-sub connector flange is slightly larger than the perimeter of the opening defined by the housing, but not the groove surrounding the opening. When the two housing members are assembled around the connector, the connector flange is seated within the groove, and the groove acts as a mounting support for the connector. Together the mounting groove and the flange act to electrically seal the end of the housing. Like the shiplap joints running the length of the housing, the shallow groove surrounding the connector opening overlaps the edge of the metal connector flange, forming a continuous metal barrier across the connector end of the housing. Thus, high frequency radiation is prevented from escaping and EMI is prevented from entering, through the connector end of the module. Prior to assembling the housing, a conductive gasket can be placed around the connector flange to ensure a tight fit between the connector flange and the mounting groove, and enhance the conductivity between the housing and connector flange.

Similar provisions are made at the media end of the module for electrically sealing the housing around the media connectors configured to attach to the alternate transfer medium. In he preferred embodiment, the high frequency data communication module comprises an MIA configured to convert signals between a copper Fibre Channel environment and an optical fiber transfer medium. The media end of the MIA is configured to mate with a standard SC-duplex fiber optic connector. As part of the optical connection, a transmitting optical sub assembly (TOSA) and receiving optical sub assembly (ROSA) are mounted within the media end of the MIA housing. The housing members include support beams for mounting the alternate media connector hardware, including the TOSA and ROSA of the preferred embodiment. In the preferred embodiment, the support beams include rounded indentations for receiving the generally barrel shaped bodies of the TOSA and ROSA. Segmented alignment ridges divide the circular indentations lengthwise, the alignment ridges corresponding to annular grooves formed in the bodies of the TOSA and ROSA optical packages. Each alignment ridge is comprised of three straight segments of equal length. When the connector housing is assembled, the alignment ridges of a first housing member lie opposite the alignment ridges of a second housing member, forming a pair of hexagonal openings in the end of the housing. The angled sides of the alignment ridges provide known points of reference for aligning the TOSA and ROSA, and automatically center the optical packages when the module is assembled, establishing the optical axes of the device.

In addition to aligning the TOSA and ROSA, the alignment grooves and ridges also serve to electromagnetically seal the media end of the module. When the module is assembled with the TOSA and ROSA seated within the rounded indentations formed in the support beams, the larger diameter portions of the TOSA and ROSA bodies overlap the segmented alignment ridges. The bodies of the TOSA and ROSA are either metal or conductive metallized plastic, as are the alignment ridges. Thus, together the TOSA, ROSA and alignment ridges form a metal barrier, or a metallized plastic barrier at the end of the module housing. In either case, the conductive nature of the barrier prevents high frequency electromagnetic radiation from escaping through the media end of the module housing and likewise prevents external EMI from entering the module.

Also included in the media end of the housing, adjacent the support beams, a pair of shallow transverse mounting ridges extend perpendicular to the optical axis of the TOSA and ROSA. These transverse mounting ridges are configured to hold plastic retaining clips insertable prior to assembling the module housing. The retaining clips include flexible retaining arms having angled hooks formed on the ends thereof. When the housing is assembled with the retaining clips properly seated in the transverse mounting ridges, an SC-duplex connector is insertable into the media end of the housing. The flexible retaining arms slide over the dual prongs of the SC-duplex connector, until they engage locking grooves formed in the sides of the SC-duplex connector prongs, securing the connector to the MIA module. The transverse mounting ridges formed to hold the clip inserts within the housing include a keyway for accepting an alignment key formed on the plastic insert clip. The alignment key ensures that the clip insert is oriented properly within the housing.

Another novel feature of the invention is the shape the module housing itself. The MIA specification lists only maximum height and width dimensions for the module. In general, prior art high frequency data communications modules, including MIA, have been configured as rectangular blocks. This shape, however, leads to complications in designing a fastening mechanism for securing the module to a host adapter board. In the preferred embodiment of the present invention, the housing has a tapered width between the media and connector ends of the housing. The connector end of the housing is sufficiently wide to enclose the connector flange of a standard nine pin D-sub connector and includes provisions for mounting screws for securing the housing to a mating nine pin connector mounted on a Fibre Channel adapter board. Immediately adjacent the connector end, however, the body of the housing forms a narrow throat portion, leaving exposed a pair of connector shoulders through which the mounting screws extend. From the narrow throat portion the width of the module housing gradually increases toward greater width of the media end of the housing. With the sidewalls tapered in this manner, a screw driver can be used to turn the mounting screws to join the module with a mating connector.

BRIEF DESCRIPTION OF THE DRAWINGS

FIG. 1 is a perspective view of a high frequency data communication module housing member according to the present invention taken from the media end of the module;

FIG. 2 is a partial perspective view of the housing member of FIG. 1 taken from the media end of the module;

FIG. 3 is a perspective view of a nine-pin D-sub connector and gasket configured to mount in the connector end of the housing member shown in FIG. 1;

FIG. 4 is an end view of an assembled module housing showing the media end of the module, the view is shown without an optical package installed;

FIG. 4A is a cross section of a typical module sidewall having a rabbet formed thereon;

FIG. 5 is a perspective view of an optical package;

FIG. 6 is a plan view of the optical package shown in FIG. 5;

FIG. 7 is a section view of an assembled MIA module housing, including optical packages, taken along the line A—A of FIG. 1; and FIG. 8 is a perspective view of a plastic clip insert for securing an SC-duplex fiber optic connector.

DETAILED DESCRIPTION OF THE PRESENTLY PREFERRED EMBODIMENTS

The present invention is for a high frequency data communication module having an improved housing. The improved housing comprises two hermaphroditic metal housing members which, when mounted in opposite transverse relation to one another, form a continuous metal housing having an internal cavity formed therein for receiving the necessary components to convert signals from a copper Fibre Channel environment to an alternate transfer medium. Forming the housing from two identical housing members helps to reduce the tooling for manufacturing the housing, thereby reducing the overall cost of the module. The module is intended to be an external pluggable device conforming to FCC Class B requirements. To meet the FCC Class B requirements, the improved module of the present invention includes a two piece metal or conductive metallized plastic housing which prevents the high frequency signals generated within the module from radiating outside the housing. The conductive housing members also act to prevent externally generated EMI from entering the module and interfering with the data signals transmitted by the module. An overlapping joint formed by the mating surfaces of the two housing members further limits spurious emissions from escaping through the seam running between the two housing members and further reduces the module's susceptibility to EMI. In the preferred embodiment the two identical housing members are formed of die cast ZA-8, or some other alloy having similar electrical characteristics. The housing members may also be formed of a conductive metallized plastic. It is also preferred that the housing members are coated with a conductive coating such as chromate. A conductive finish helps to fight corrosion, and improves the conductivity of the housing.

Turning to FIG. 1, a first housing member 100 is shown in isometric view. Housing member 100 includes a connector end 102 and a media end 104. The connector end 102 is configured to receive a standard nine-pin D-sub connector 114, as shown in FIG. 3. The term "standard" used in referring to the nine-pin connector relates only to the physical dimensions of the connector. It is contemplated that a high frequency nine-pin D-sub connector will be used having superior electrical qualities as compared to standard, non-high frequency connectors. The media end 104 of housing member 100 is configured to receive the connector hardware for interfacing with the alternate medium. In the preferred embodiment the alternate medium is a Fibre Channel link comprising a pair of optical fibers terminated with an SC-duplex connector (connector not shown). Therefore, the media end 104 of housing member 100 must be configured to receive the optical and connector hardware for mating with the duplex connector. The description which follows assumes an SC-duplex connection, however, it should be clear to those skilled in the art that the media end 104 can be readily adapted to interface with fiber optic connectors other than SC-duplex connectors, and with media other than optical fiber altogether.

The complete module housing comprises a pair of substantially identical housing members 100, 100' assembled in opposite transverse relation to one another as shown in FIG. 4. For convenience, only housing member 100 is shown in FIG. 1, but the important structural features of housing members 100 and 100' are identical so that the features shown and referred to in FIG. 1 apply equally as well to housing member 100'. When assembled as shown in FIG. 4 the two housing members 100, 100' together form an outer shell surrounding an internal cavity. The electronic components necessary to convert from the Fibre Channel copper environment to the fiber optic media are mounted to a printed circuit board (not shown) which mounts within the cavity formed between the two housing members 100, 100'.

Referring to FIG. s 1,4 and 4a, each housing member 100, 100' is formed with longitudinal sidewalls 106, 107 (106', 107') having hermaphroditic mating structures formed thereon. In the plan view of FIG. 4, showing the end of housing members 100, 100' in mated relation to one another, the profile of sidewalls 106, 107 (106', 107') can be seen. The top surface of each sidewall 106, 107 and 106', 107' include a rabbet 108, or rectangular cutout at the top of the sidewall. A generic rabbet is shown in profile in FIG. 4a. The rabbet 108 includes a shoulder 110 which represents the bottom, horizontal surface of the rabbet, and a cheek 112 which represents the vertical component of the rabbet. As can be seen, the shoulder 110 extends perpendicular to the cheek 112 forming a rectangular recess at the top of each sidewall.

Importantly, the rabbets on the two sidewalls 106, 107 (106', 107') of an individual housing member 100, 100' face the same direction. However, the width of the various components of the rabbets are asymmetrical from sidewall to sidewall and the cheeks are sloped outward from the top of the rabbet to the shoulder. Comparing the rabbet of sidewall 106 with that of sidewall 107, the shoulder 109 of sidewall 106 is wider than the shoulder 111 of sidewall 107. Correspondingly, the cheek 113 of sidewall 106 is narrower than the cheek 115 of sidewall 107. Viewing the interlocking matablility of housing members 100, 100' it is clear that the width of the narrower cheek 113 of sidewall 106 approximately equals the width of the narrower shoulder 111' of sidewall 107'. Similarly, the wider cheek 115 of sidewall 107 equals the width of the wider shoulder 109' of sidewall 106'. The direction of the rabbets and the asymmetric character of the cheeks and shoulders creates the hermaphroditic quality of the mating sidewalls 106, 107 (106', 107'). When identical housing member 100' is mated in opposite transverse relation to first housing member 100, sloped cheeks 113 and 115' overlap one another as do sloped cheeks 115 and 113'. The sloped surfaces of the cheeks 113, 115' and 113', 115 engage one another in a sliding, or scraping manner, each cheek tending to force it's counterpart in the opposite direction. As the two housing members 100,100' are forced further together, the cheeks 113, 115' and 113', 115 form a tighter and tighter fit, such that each longitudinal side of the module housing is completely sealed, due to the interaction of the sloped rabbet cheeks.

The significance of the shiplap joint formed by the mating sidewalls of housing members 100, 100' is that when the housing members are assembled around high frequency components, there is no direct path for spurious high frequency emissions to escape or EMI to enter the housing through the shiplap joint. The mutually opposing sloped cheeks form a continuous conductive barrier, such that high frequency radiation directed toward one of the longitudinal seams will necessarily strike the metal or metallized surface of the interlocking cheeks which make up the joint. The overlapping cheeks act as redundant barriers preventing radiation from escaping the module and EMI from entering.

In addition to the shiplap joint just described, alternate hermaphroditic mating structures for interlocking the two housing members 100, 100' are possible. For example, a tongue and groove approach serves the same function of providing an overlapping joint with no direct path for high frequency radiation to escape or EMI to enter the housing. To effect this type of joint, narrow tongue of material (similar to the cheek described in relation to the shiplap joint, but extending from the center of the sidewall rather than one side or the other) is insertable into a corresponding groove formed in the center of the upper surface of an opposing side wall. With the tongue always formed on the same sidewall, and the groove always formed on the other, the housing member remains hermaphroditic. The tongues and grooves of identical housing members facing one another in opposing transverse relation will align with one another to form the requisite overlapping type joint to block spurious emissions. Any number of alternate joints are also available, provided they include overlapping metal sides to prevent high frequency radiation from escaping or EMI entering the module, and allow a single housing member to be used as either side of the MIA module housing.

Housing member 100 further includes a pair of internal bosses 117, 119 abutting each sidewall 106, 107. Each boss includes a vertical bore 121, 123. (A second, identical housing member 100' also includes identical bosses 117', 119' and bores 121' 123' which will be referred to, but are not shown in the Figures.) Vertical bore 123 is a through bore extending all the way through housing member 100, and vertical bore 121 is only a partial bore. Bosses 117, 119 serve two purposes. First, they act as support members for a printed circuit board (not shown), and second, the bores formed within the bosses provide a fastening mechanism for joining two transversely opposed housing members. An appropriately shaped printed circuit board carrying the electronic components necessary for interfacing between the various transfer media can be inserted into the housing member 100 such that the printed circuit board rests on the two bosses 117, 119. It is preferred that the printed circuit board include apertures corresponding to the location of the bores 121, 123. When a second, identical housing member 100' is mated opposite housing member 100, identical bosses 117', 119' contact the printed circuit board directly opposite bosses 119, 117. Bores 121', 123' will line up with bores 123, 121. Thus, the through bore 123 will be opposite partial bore 121', and through bore 123' will be opposite partial bore 121. The printed circuit board will be held securely in place between bosses 117, 119' and 119, 117'. Self tapping screws can then be used to secure the two housing members 100, 100' together. Through bores 123, 123' will have a larger diameter than the cutting threads of the self tapping screws, while partial bores 121, 121' will have a slightly smaller diameter. A first self tapping screw can be inserted from outside the module housing through through bore 123. The screw will pass through boss 119 and the corresponding aperture in the printed circuit board without resistance, but must be turned with a screwdriver to engage boss 117' on the second housing member 100'. A second self tapping screw can be inserted from outside the module housing through bore 123' in a like manner. Together the two self tapping screws are sufficient to firmly hold the entire assembly together.

Eliminating spurious emissions through the shiplap joint helps the module meet the FCC Class B requirements. Similar provisions for containing high frequency radiation are provided at the connector end 102 and media end 104 of the housing as well.

Referring to now FIGS. 1 and 3, the mounting provisions for a nine-pin D-sub connector 114 can be seen. The connector end 102 of housing member 100 forms a rectangular mounting structure for receiving connector 114. The connector 114 includes a D-shell 116, contact pins 118, and a metal mounting flange 120. Edge connectors (not visible in the perspective view of FIG. 3) are provided on reverse side of mounting flange 120. The edge connectors allow connector 114 to be soldered to contacts formed on the edge of a printed circuit board (not shown) which is to be mounted within the module housing. The connector end 102 of housing member 100 is formed with a shallow groove 122 configured to receive the metal flange 120 of connector 114. Groove 122 extends horizontally along the bottom of housing member 100 and vertically up the sides 124 of the connector mounting structure. Connector flange 120 is fully insertable into groove 122 such that the lower horizontal edge 126 of the flange rests in the bottom of groove 122, and vertical edges 128, 130 engage the vertical sides of the groove 132, 134. When a second identical housing member 100' having an identical connector mounting structure is mated with housing member 100, the upper portion of connector flange 120 slideably engages a second groove formed in the second housing member until the top edge 136 of connector flange 120 is seated within the second mounting groove of the second housing member 100'. With the connector flange 120 seated within groove 132, and a second identical housing member mated above, the entire periphery of metal flange 120 is overlapped by the mounting grooves formed in the two housing members.

As with the shiplap joint created by the overlapping sidewalls of the two housing members 100, 100', the overlapping nature of mounting grooves 132, 132' with the periphery of the connector flange 120 act to electromagnetically seal the connector end 102 of the two fully assembled housing members 100, 100'. High frequency radiation generated within the module will have no direct path out of the connector end of the module. The overlapping grooves and flange will prevent the radiation from escaping the module. A conductive gasket 137 can be added to the metal flange 120 to improve the conductivity between the metal flange and the connector housing members 100. 100'. The improved conductivity helps to further seal the connector end of the module.

Turning now to FIGS. 2, 4, 5, 6, and 7, structural features for electromagnetically sealing the media end 104 of the module housing will be described. The preferred embodiment provides an MIA module for converting from a copper medium to a fiber optic medium with connector hardware configured to receive an SC-duplex fiber optic connector. Therefore, the present description concentrates on mounting features related to optical transmitter and receiver packages. However, it should be noted that high frequency data communication modules can be configured to interface with media other than optical fiber. It should be apparent to one of ordinary skill in art that the mounting provisions for the optical elements of the preferred embodiment can be readily adapted to apply to other media connectors without deviating from the novel aspects of the invention.

In order to transmit and receive data, an MIA must include a transmitting optical subassembly (TOSA), and a receiving optical subassembly (ROSA). While the optical devices within the TOSA and ROSA serve opposite functions, the outer packages of the two assemblies are relatively similar. A typical optical package 140 is shown in isometric view in FIG. 5, and plan view in FIG. 6. The generalized outer package shown can serve as either a TOSA or a ROSA, requiring only slight modifications to serve in either capacity. Optical package 140 has a generally barrel shaped main body 142 with an annular groove 144 formed therein approximately midway down the length of the body 142. As best seen in the plan view of FIG. 6, the annular groove 144 defines a narrow section of the optical package body having a smaller diameter than the rest of the body 142. An elongated hollow nose portion 146 protrudes from the main body and provides the interface between an optical transfer medium (not shown) and the optoelectronic devices mounted within the package.

Returning to housing member 100, the media end 104 is generally open for receiving an SC-duplex connector. A divider 148 extends longitudinally to divide the back end between a transmit side and a receive side. The two sides are differentiated only by the electronic components inserted into the housing, physically the two sides are identical. When housing member 100 is mated to a second housing member 100' as shown in FIG. 4, the two housing members define two rectangular openings 150, 152 for receiving the two prongs of an SC-duplex connector. Each housing member is formed with TOSA and ROSA support beams 154, 156 extending transversely across openings 150, 152 a short distance from the end of the housing member. Support beams 154, 156 include semi-circular grooves 158, 160 having roughly the same diameter as the barrel shaped bodies of the TOSA and ROSA. Segmented alignment ridges 162, 164 divide each support beam groove 158, 160, in the lengthwise direction. The width of alignment ridges 162, 164 is only slightly less than the width of the annular groove 144 formed in the body of the optical packages. Support beams 154, 156 are configured such that optical packages 140 may be inserted axially within grooves 158, 160, with the nose portion 146 of the optical packages protruding outward toward the media end of the module housing. With the optical packages inserted in this manner, the segmented alignment ridges 162, 164 engage the annular grooves 144 formed in the body of the optical packages.

Alignment ridges 162, 164 help to center and align the TOSA and ROSA within the module housing. This aligning action of the segmented ridges 162, 164 is best understood with reference to the cross sectional view of FIG. 7. FIG. 7 shows a portion of two housing members 100, 100' assembled around an optical package 140. The cross section is taken along a line running directly through the center of alignment ridges 162, 164. Though only one side of the module is shown, both ridges 162, 164 function in the same manner as described herein. In profile it can be seen that each segmented ridge comprises three individual straight segments: angled sides 170, 172 and horizontal side 174. Corresponding segments 170', 172' and 174' comprise the alignment ridges on the mating housing member 100'. In combination the linear segments 170, 172, 174 and 170', 172', 174' define a hexagonal opening between the two housing members 100, 100. The size of the hexagonal opening corresponds to the smaller diameter portion of the optical package 140 as defined by annular groove 144. Linear segments 170, 172 and 170', 172' of the alignment ridge 164 tangentially engage the smaller diameter portion of the package body. The angled linear segments provide established physical reference points for centering the optical packages. Thus, when the two housing members 100, 100' are assembled with an optical package 140 disposed therebetween, the optical package is positively positioned in a predetermined location and orientation.

In addition to locating the optical packages, the segmented alignment ridges 162, 164 also cooperate with the larger diameter body 142 of the optical packages to electromagnetically seal the media end 104 of the module housing. When the two housing members 100, 100' are assembled around an optical package 140 as described, the segmented ridges 162, 164 overlap the annular groove 144.

In FIG. 7, the outer circumference of an optical package 140 is shown as circular dashed line 178. The outer diameter of the optical package completely encircles the hexagonal opening defined by the alignment ridges. As with the groove 122 and connector flange 120 at the connector end of the module housing (see FIGS. 1 and 3), the overlapping of the metallic body 142 of the optical package 140 with the metal alignment ridge acts to electromagnetically seal the media end of the fully assembled module housing. The same sealing action occurs between ridges 162, 164 and both the TOSA and ROSA optical packages. High frequency radiation generated within the module will have no direct path to escape out of the media end 104 of the module. The overlapping ridges 162, 164 and annular grooves 144 of the TOSA and ROSA seal the media end of the module.

An additional structural feature of the die cast zinc-aluminum housing member 100 is keyed mounting slots 180, 181 located directly behind support members 154 and 156 respectively. Each mounting slot is formed with a narrow keyway 183 in the left corner (as viewed in FIG. 2) of the slot. The mounting slots are provided to engage a pair of connector retaining clips and hold the clips within the assembled module housing. A single retaining clip 182 is shown in FIG. 8. Clip 182 includes a back plane 184 having a circular aperture 186 formed in the center thereof. The circular aperture is sized to engage the elongated nose 146 of a TOSA or ROSA. The interaction of the nose 146 with the aperture positions the clip relative to the optical elements within the module. A pair of flexible retaining arms 188 extend perpendicularly from the back plane 184. The retaining arms are formed with angled hooks 190 for engaging cooperating grooves formed in the sides of each prong of an SC-duplex connector. The hooks and grooves combine to form a latch which secures an inserted SC-duplex connector to the MIA module. Two alignment keys 194, 196 are formed on diagonally opposite corners of the retaining clip backplane 184. Alignment keys 194, 196 are configured to engage the keyways 183 in the corners of mounting slots 180, 181. The keys ensure that the retaining clips are inserted within the housing member with the proper orientation. As pictured in FIG. 8, the lower left key 194 fits into one of the keyways 183 formed in either mounting slot 180 or 181 of housing member 100. When a second housing member 100' is mounted opposite the first housing member 100, the keyways 183' of the second housing member 100' will be reversed. Key 196 engages one of the upper keyways 183' of the second housing member 100', consistent with the hermaphroditic character of the MIA housing member.

Finally, the mounting provisions of the high frequency data communication module housing must be considered. The maximum outer dimensions of MIA modules are determined by the MIA specification. Furthermore, the minimum dimensions of the module housing are established by the mounting requirements of a nine-pin D-sub connector, and the particular media connector hardware requirements of a particular application. Referring back to FIGS. 1 and 3, the connector end 102 of housing member 100 includes a rectangular mounting structure for receiving a nine-pin D-sub connector as previously described. The mounting structure includes lateral housings 194, 196 flanking each side of the mounting structure. Lateral housings 194, 196 each include rounded longitudinal depressions 198, 200. Longitudinal depressions 198, 200 combine with like depressions on a mating housing member 100' to form mounting screw cavities. The mounting screw cavities so formed are axially aligned with mounting screw apertures 202, 204 formed in the connector flange 120. The two housing members can be assembled with mounting screws retained within the cavities and extending through apertures 202, 204. Assembled in this manner, the mounting screws can be used to threadably engage the mounting provisions of a matable-D-sub connector attached to a Fibre Channel adapter board, thereby securing the module to the adapter board.

The minimum width dimension of the media end 104 of housing member 100 is also restricted by the mounting requirements of the media connector hardware. The media end 104 of housing member 104 must be wide enough to accommodate the connector hardware necessary for the particular application, in the preferred embodiment an SC-duplex fiber optic connector. However, the width of housing member 100 between the connector end 102 and the media end 104 need not be as wide as the nine-pin D-sub connector and media connector require. In the preferred embodiment of connector housing 100, sidewalls 106, 107 are tapered, angling inwardly from a maximum width adjacent media end 104 to a narrow throat portion immediately adjacent the connector mounting structure at the connector end 102. The functional significance of the tapered sidewalls 106, 107 is that shorter mounting screws can be used to secure the MIA module to a mating adapter board. Instead of longer screws extending the length of the module, and possibly interfering with the optical components at the media end, the tapered sides allow shorter screws to be used which extend only a short distance past the connector mounting structure. The degree of taper on sidewalls 106, 107 is such that a narrow screw driver can be inserted into the head of the mounting screws to turn the screws and join the MIA module with the Fibre Channel adapter board.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A housing member for enclosing a high frequency data communication module, the housing member being hermaphroditic such that a pair of said housing members being substantially identical can be assembled in opposite transverse relation to form a module housing, the housing member comprising:

a horizontal surface having a first end and a second end and lateral sides;

first and second longitudinal sidewalls extending generally perpendicular to the horizontal surface along each lateral side thereof; and interlocking mating structures formed along upper edges of the sidewalls, the mating structures extend substantially along a length of the sidewalls, the mating structures being configured such that the mating structure formed on the first longitudinal sidewall will interlock and overlap with a mating structure identical to the mating structure formed on the second longitudinal sidewall when brought into opposite transverse alignment therewith so as to enclose the high frequency data communication module.

2. The housing member of claim 1 wherein the interlocking mating structures comprise a tongue formed on the first longitudinal sidewall, and a groove formed in the second longitudinal sidewall.

3. The housing member of claim 1 wherein the interlocking mating structures comprise parallel facing rabbets formed on each longitudinal sidewall.

4. The housing member of claim 3 wherein the rabbet formed on the first longitudinal sidewall comprises a relatively wide shoulder and relatively narrow cheek, and the rabbet formed on the second sidewall comprises a relatively narrow shoulder and a relatively wide cheek, the relatively wide cheek of the second sidewall rabbet being approximately the same width as the relatively wide shoulder of the first sidewall rabbet, and the relatively narrow cheek of the first sidewall rabbet being approximately the same width as the relatively narrow shoulder of the second sidewall rabbet and the cheeks of each rabbet being sloped, becoming gradually wider adjacent each shoulder.

5. The housing member of claim 3 wherein the first end of the housing member includes connector mounting provisions configured to receive one half of an electrical connector flange and providing an overlap of conductive materials around one half of the connector flange perimeter.

6. The housing member of claim 5 wherein the connector mounting provisions include vertical slots formed in the first and second sidewalls and a shallow groove in the horizontal surface, the vertical slots and shallow groove all being contained in the same plane.

7. The housing member of claim 6 wherein a conductive gasket is provided to be installed around the perimeter of a connector flange, and inserted within the vertical slots and shallow groove comprising the connector mounting provisions.

8. The housing member of claim 3 wherein the second end of the housing member includes transmitter and receiver mounting provisions for receiving a transmitter sub-assembly and a receiver sub-assembly, wherein the transmitter and receiver mounting provisions are configured to overlap one half the perimeter of the transmitter and receiver subassemblies.

9. The housing member of claim 8 wherein the transmitter sub-assembly and the receiver sub-assembly are formed of a conductive metal.

10. The housing member of claim 8 wherein the transmitter sub-assembly and the receiver sub-assembly are formed of a conductive metallized plastic.

11. The housing member of claim 8 wherein the transmitter and receiver mounting provisions include segmented ridges configured to engage reduced diameter portions of the transmitter and receiver subassemblies.

12. The housing member of claim 11 wherein the segmented ridges comprise three linear segments forming one half of a hexagonal opening.

13. A housing member for enclosing a high frequency data communication module, the housing member being hermaphroditic such that a pair of said housing members being substantially identical can be assembled in opposite transverse relation to form a module housing, the housing member comprising:

a horizontal surface having a first end and a second end and lateral sides;

first and second longitudinal sidewalls extending generally perpendicular to the horizontal surface along each lateral side thereof; and interlocking mating structures formed along upper edges of the sidewalls, the mating structures being configured such that the mating structure formed on the first longitudinal sidewall will interlock with a mating structure identical to the mating structure formed on the second longitudinal sidewall when brought into opposite transverse alignment therewith so as to enclose the high frequency data communication module, and wherein the first end of the housing member includes connector mounting provisions configured to receive one half of a connector flange and providing an overlap of conductive materials around one half of the connector flange perimeter.

14. The housing member of claim 13 wherein the connector mounting provisions include vertical slots formed in the first and second sidewalls and a shallow groove in the horizontal surface, the vertical slots and shallow groove all being contained in the same plane.

15. The housing member of claim 14 wherein a conductive gasket is provided to be installed around the perimeter of a connector flange, and inserted within the vertical slots and shallow groove comprising the connector mounting provisions.

16. The housing member of claim 1 wherein the second end of the housing member includes transmitter and receiver mounting provisions for receiving a transmitter sub-assembly and a receiver sub-assembly, wherein the transmitter and receiver mounting provisions are configured to overlap one half the perimeter of the transmitter and receiver subassemblies.

17. The housing member of claim 16 wherein the transmitter and receiver mounting provisions include segmented ridges configured to engage reduced diameter portions of the transmitter and receiver subassemblies.

18. The housing member of claim 17 wherein the segmented ridges comprise three linear segments forming one half of a hexagonal opening.

19. The housing member of claim 1 wherein the width of the housing member is tapered between the second and first end.

20. The housing member of claim 1 wherein the housing member is formed of a zinc-aluminum alloy.

21. The housing member of claim 1 wherein the housing member is formed of a conductive metallized plastic.

22. A Media Interface Adapter module for converting Fibre Channel data signals from a first copper transfer medium to a second alternate transfer medium, the module comprising:

a printed circuit board having electronic components for converting signals between the first and second transfer media mounted thereon;

a transmitter for transmitting the data signals over the second alternate transfer medium;

a receiver for receiving data signals over the second alternate transfer medium;

an electrical connector for connecting the module to the first copper transfer medium, the connector having a metal flange; and first and second conductive housing members configured to enclose the printed circuit board, transmitter, receiver, and electrical connector, the first and second housing members having longitudinal sidewalls with mating surfaces forming an overlapping joint between the two housing members;

the first and second housing members further including connector mounting structures configured to partially overlap the electrical connector and the transmitter and receiver mounting structures are configured to partially overlap the transmitter and receiver.

23. The Media Interface Adapter module of claim 22 wherein the first and second housing members define a connector opening, the perimeter of the connector opening being smaller than the perimeter of the connector flange, and the connector mounting structure comprises a connector mounting groove formed in the first and second housing members immediately behind the connector opening, the groove extending around the entire connector opening, and the connector flange being seated within the connector mounting groove such that a portion of the conductive housing members overlap the perimeter of the connector flange.

24. The Media Interface Adapter module of claim 23 further comprising a conductive gasket disposed around the outer perimeter of the connector flange between the flange and the connector mounting groove.

25. The Media Interface Adapter module of claim 22 wherein the first and second housing members define a media connector opening for receiving a media connector corresponding to the alternate transfer medium.

26. The Media Interface Adapter module of claim 25 wherein each of the transmitter and receiver are contained within sub assemblies having conductive outer surfaces disposed within the media connector opening.

27. The Media Interface Adapter module of claim 26 wherein the alternate transfer medium comprises a pair of optical fibers.

28. The Media Interface Adapter module of claim 27 wherein the transmitter and receiver sub assemblies comprise cylindrical bodies having a first outer diameter, and having an annular groove formed therein defining a second smaller diameter; and the transmitter and receiver mounting structures comprise segmented ridges configured to fit within the annular grooves and engage the smaller diameter portion of the metal sub assembly bodies, the outer diameter of the sub assemblies overlapping the segmented ridges.

29. The Media Interface Adapter module of claim 22 wherein the mating surfaces of the longitudinal sidewalls comprise rabbets formed on each sidewall, the rabbets on each sidewall of each housing member facing the same direction.

30. The Media Interface Adapter module of claim 29 wherein each of the first and second housing members include a first longitudinal sidewall, and a second longitudinal sidewall, the rabbet formed on the first sidewall having a shoulder wider than a shoulder of the rabbet formed on the second sidewall, and the rabbet on the first sidewall having a cheek narrower than a cheek of the rabbet formed on the second sidewall, the cheeks being sloped, such that the cheeks become wider adjacent the shoulders.

31. The Media Interface Adapter module of claim 22 wherein the overlapping joint comprises a tongue-in-groove joint, the mating surfaces comprising a tongue formed on a first longitudinal sidewall of the first housing member, insertable into a groove formed in a second longitudinal sidewall of the second housing member.

32. A method of preventing spurious emissions from a high frequency data communications module, the method comprising the steps of:

providing a printed circuit board having a first end, and a second end, and having electronic components for converting signals between a first signal transfer medium and a second signal transfer medium mounted thereon;

attaching a D-shell connector to the first end of the printed circuit board, the D-shell connector having a mounting flange;

attaching a transmit optical subassembly having an annular groove formed therein to the second end of the printed circuit board;

attaching a receive optical subassembly having an annular groove formed therein to the second end of the printed circuit board beside the transmit optical subassembly;

providing a first housing member having hermaphroditic inter-mateable longitudinal sides, first open end including a mounting groove, and a second open end including a pair of optical package alignment ridges;

providing a second housing member substantially identical to the first housing member;

placing the printed circuit board into the first housing member;

enclosing the printed circuit board with the second housing member, the hermaphroditic intermateable sides of the first and second housing members interlocking to form a longitudinal ship-lap joint between the first and second housing members, the mounting grooves of the first and second housing members overlapping the perimeter of the D-shell connector flange, and the optical package alignment ridges overlapping the annular grooves formed in the transmit and receive optical sub assemblies.

* * * * *